H. ANDRIX.
NUT LOCK.
APPLICATION FILED FEB. 10, 1919.
1,320,962.
Patented Nov. 4, 1919.
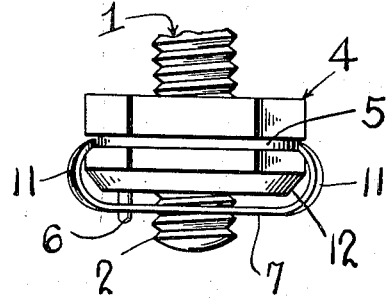
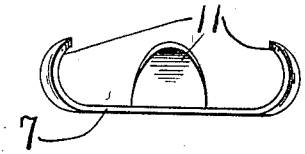
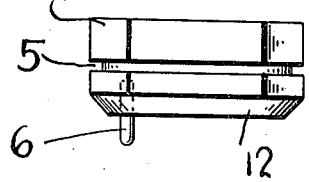
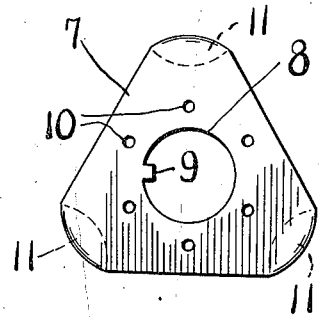
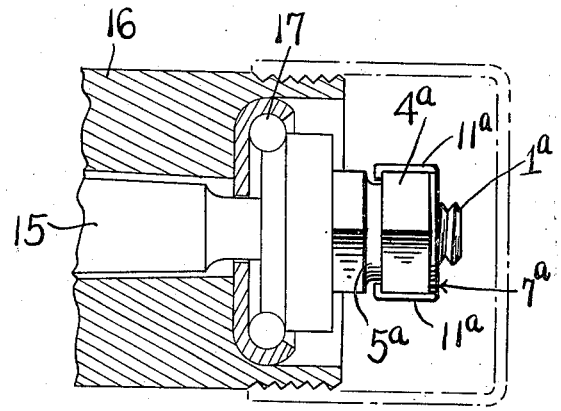
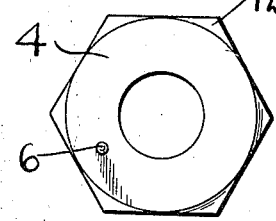
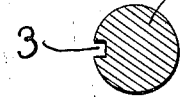
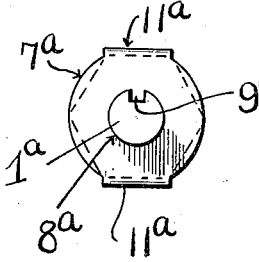
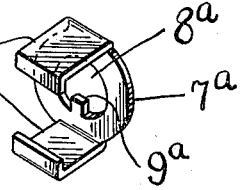
WITNESS:
L. B. James
T. E. Turpin
INVENTOR.
Harry Andrix
BY
Victor J. Evans
ATTORNEY.

UNITED STATES PATENT OFFICE.

HARRY ANDRIX, OF ADRIAN, MICHIGAN, ASSIGNOR OF ONE-FOURTH TO GEORGE D. HARRIS AND ONE-FOURTH TO GEORGE D. HARRIS, JR., BOTH OF ROYAL OAK, MICHIGAN.

NUT-LOCK.

1,320,962.      Specification of Letters Patent.      Patented Nov. 4, 1919.

Application filed February 10, 1919. Serial No. 276,224.

*To all whom it may concern:*

Be it known that I, HARRY ANDRIX, a citizen of the United States, residing at Adrian, in the county of Lenawee and State of Michigan, have invented new and useful Improvements in Nut-Locks, of which the following is a specification.

The object of my invention is to provide a simple, compact and efficient nut lock, and one in which the elements may be expeditiously and easily assembled notwithstanding the fact that when in use there is no liability of any one of the elements being casually displaced by shock or jar.

To the attainment of the foregoing the invention consists in the peculiar construction, novel combinations and adaptation of parts hereinafter described and claimed.

In the accompanying drawings hereby made a part hereof:

Figure 1 is a side elevation of my novel nut lock.

Figs. 2, 3 and 4 are projected views of the washer, the nut and the bolt, respectively.

Fig. 5 is an edge elevation of the washer.

Fig. 6 is an edge elevation of the nut.

Figs. 7, 8 and 9 are views illustrative of a modification of the invention.

Reference will first be had to Figs. 1 to 6 of the drawings.

By comparison of Figs. 1 and 4 it will be noted that the bolt 1 is provided with a threaded end portion 2 and with a longitudinal groove 3 milled or otherwise formed therein.

The nut 4 is preferably of angular form and is characterized by a circumferential groove 5 and by a pin 6 which is permanently embedded in or otherwise fixed to the nut off the center thereof.

As will be best understood by reference to Figs. 2 and 5, the washer 7 is of spring steel or other material compatible with its purpose and is therefore possessed of the requisite resiliency. The said washer is of general triangular form in outline and is provided with a central aperture 8 of a size to receive the bolt and is also provided with a key 9 adapted to coöperate with the bolt groove 3. Formed in the washer and disposed about the aperture 8 is a circular series of apertures 10, one of which is adapted to receive the pin 6. At its corners the washer is provided with integral flanges 11 adapted to seat in and coöperate with the groove 5 of the nut.

In the practical use of my improvement the nut is turned to the point desired on the threaded portion of the bolt, the washer is then placed upon the bolt and is connected by its key to the bolt whereby turning of the washer on the bolt is precluded. The washer is also pressed toward the face of the nut whereupon the washer flanges 11 will ride over the beveled outer portion 12 of the nut and will spring into the groove 5 and thereby strongly connect the washer and nut, and will, when the nut is of angular formation, effectually prevent turning of the nut on the bolt. At the same time the pin 6 will be received in one of the apertures 10 of the washer and in that way the strength of the connection between washer and nut will be strengthened.

When it is desired for any reason to release the nut the same may be readily accomplished on the interposition of a prying implement between the flanges 11 and the nut so as to permit of the washer being moved laterally away from and out of engagement with the nut.

It will be apparent from the foregoing that when my novel nut lock is formed as stated there is no liability of any of its parts being casually displaced and it will also be observed that the nut lock is well adapted to withstand rough usage and is not likely to be affected by weather conditions.

It will also be appreciated that all of the parts of my novel nut lock are susceptible of being produced without the employment of expensive machinery.

In Figs. 7, 8 and 9 I illustrate a modification of my invention which in effect is a material simplification. In the said modification the exteriorly threaded member $1^a$ is the end portion of a spindle 15 that may be and preferably is part of an automobile knuckle, and is designed to be arranged as shown in Fig. 7 relative to a wheel hub 16 and the anti-friction bearing 17 thereof. The threaded portion $1^a$ is provided with a longitudinal groove similar to the groove 3 before alluded to. Mounted on the threaded portion $1^a$ is a nut $4^a$ which is preferably hexagonal and has a circumferential groove $5^a$. In combination with the said threaded member $1^a$ and nut $4^a$, I employ in the modification a resilient washer 7ª that is apertured at 8ª to loosely receive the member 1ª, and is provided in the said aperture with a key 9ª. The said washer 7ª is provided on its major portion with opposite arms 11ª that terminate in inwardly directed end portions adapted to seat in the groove 5ª as illustrated. Manifestly the washer characterized as stated is adapted to be expeditiously and easily applied and is also adapted to be readily removed after the arms 11ª are pressed outwardly by a prying instrument interposed between the same and the nut. When, however, the washer is arranged as shown in Fig. 7, there is no liability whatever of accidental displacement of the washer, and hence the same may be depended upon to effectually prevent any accidental displacement of the nut from the threaded member 1ª.

Having described my invention what I claim and desire to secure by Letters Patent is:

1. The combination in a nut lock, of a threaded element having a longitudinal groove, a threaded nut mounted on the threaded portion of said element and having a circumferential groove and also having a beveled outer portion, a pin fixed to and projecting from the face of the nut, and a resilient washer receiving the threaded portion of the first named element and having a key disposed in the groove thereof and a circular series of apertures one of which receives the pin and also having flanges curved outwardly and disposed in the groove of the nut; said flanges being capable of riding over the beveled portion of the nut.

2. The combination in a nut lock, of a threaded bolt having a longitudinal groove, an angular threaded nut mounted on the threaded portion of the bolt and having a circumferential groove and a beveled outer portion, and a resilient washer receiving the threaded portion of the bolt and having a key disposed in the bolt groove and also having flanges disposed in the groove of the nut; said flanges being capable of riding over the beveled portion of the nut.

3. As a new article of manufacture, a threaded nut having a circumferential groove and an outer beveled portion and also having a pin projecting from its face off the center thereof.

4. As a new article of manufacture, a triangular resilient washer apertured to receive a bolt and having a key extending into its aperture, a circular series of small apertures surrounding the first named aperture and outwardly and inwardly curved lateral flanges at its corners.

In testimony whereof I affix my signature.

HARRY ANDRIX.